United States Patent [19]
Marschall

[11] Patent Number: 5,890,225
[45] Date of Patent: Apr. 6, 1999

[54] SKYDIVING GARMENT FOR ENHANCING CONTROL AND MANEUVERABILITY DURING FREE-FALL

[76] Inventor: Wendy A. Marschall, 205 Everett St., Spring Lake, N.C. 28390

[21] Appl. No.: 688,654

[22] Filed: Jul. 26, 1996

[51] Int. Cl.⁶ ..................................................... A41D 13/02
[52] U.S. Cl. ........................ 2/69; 2/79; 2/247; 2/DIG. 1; 244/143
[58] Field of Search .............................. 2/67, 79, 70, 93, 2/455, 456, 69.5, 247, 242, 227, 125, DIG. 1; 244/143, 151 R; 482/105, 74, 55

[56] References Cited

U.S. PATENT DOCUMENTS

| | | | |
|---|---|---|---|
| 2,079,980 | 5/1937 | Anders | 2/DIG. 1 |
| 2,391,535 | 12/1945 | Zelano | 2/227 |
| 2,715,226 | 8/1955 | Weiner | 2/DIG. 1 |
| 3,742,518 | 7/1973 | Garcia | 2/79 |
| 3,969,772 | 7/1976 | Pravaz | 2/79 |
| 4,071,236 | 1/1978 | Opreau | 2/67 |
| 4,722,099 | 2/1988 | Kratz | 2/79 |
| 4,731,883 | 3/1988 | Foster | 2/69 |
| 5,054,127 | 10/1991 | Zevchak | 2/69 |
| 5,642,526 | 7/1997 | Thompson | 2/79 |

*Primary Examiner*—Michael A. Neas
*Attorney, Agent, or Firm*—Myers Bigel Sibley & Sajovec, P.A.

[57] ABSTRACT

A skydiving garment provides a wearer with enhanced control, maneuverability, and lateral speed during free-fall. The garment includes a torso portion having sleeves and leg portions depending therefrom which have a tubular configuration and are sized to receive the arms and legs of the wearer, respectively. At least one pocket is mounted on the exterior surface of each sleeve and leg portion. Each pocket has an opening which extends in the direction of the limb and which is configured to selectively balloon open when exposed by the wearer to an airstream during free-fall.

37 Claims, 2 Drawing Sheets

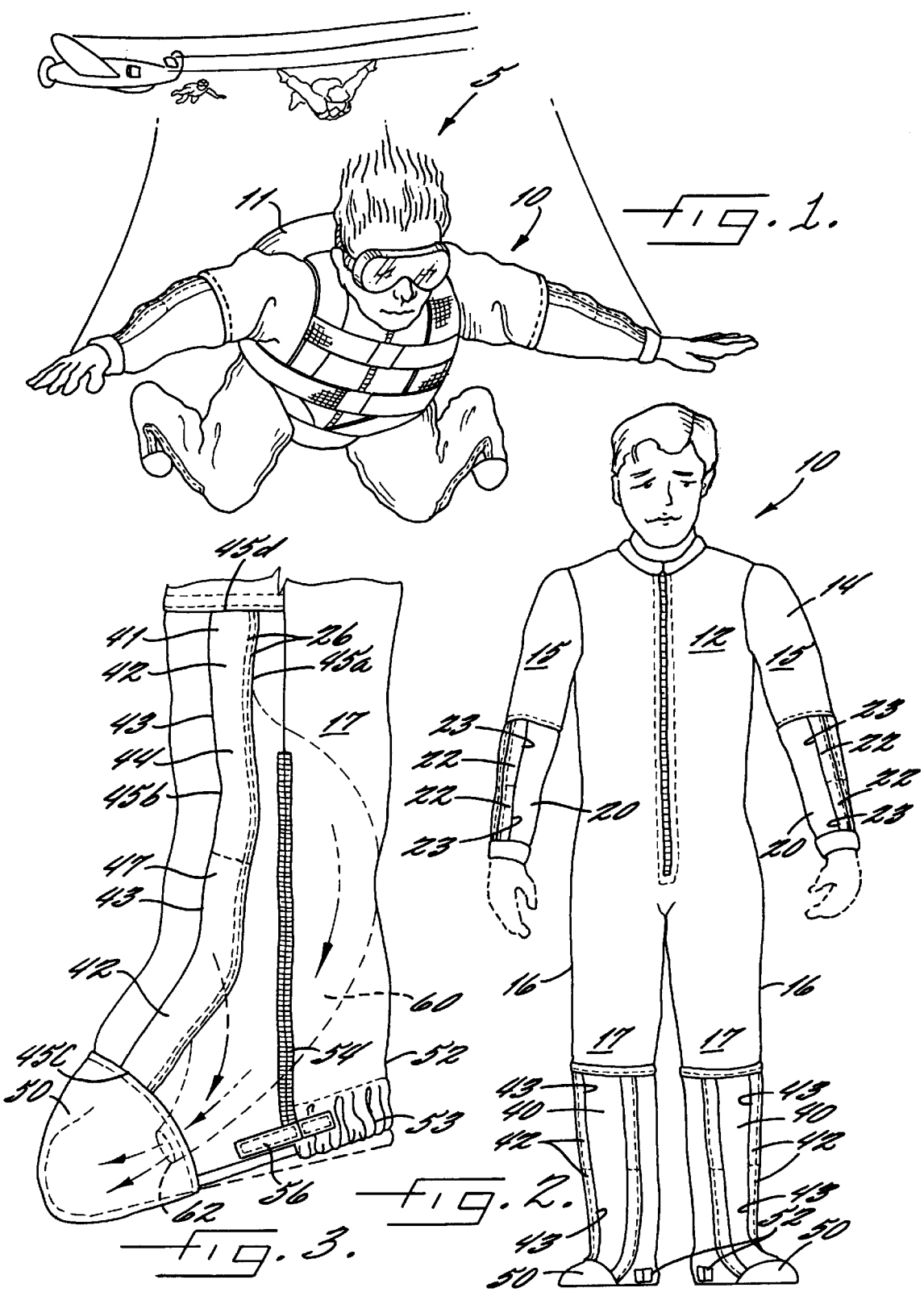

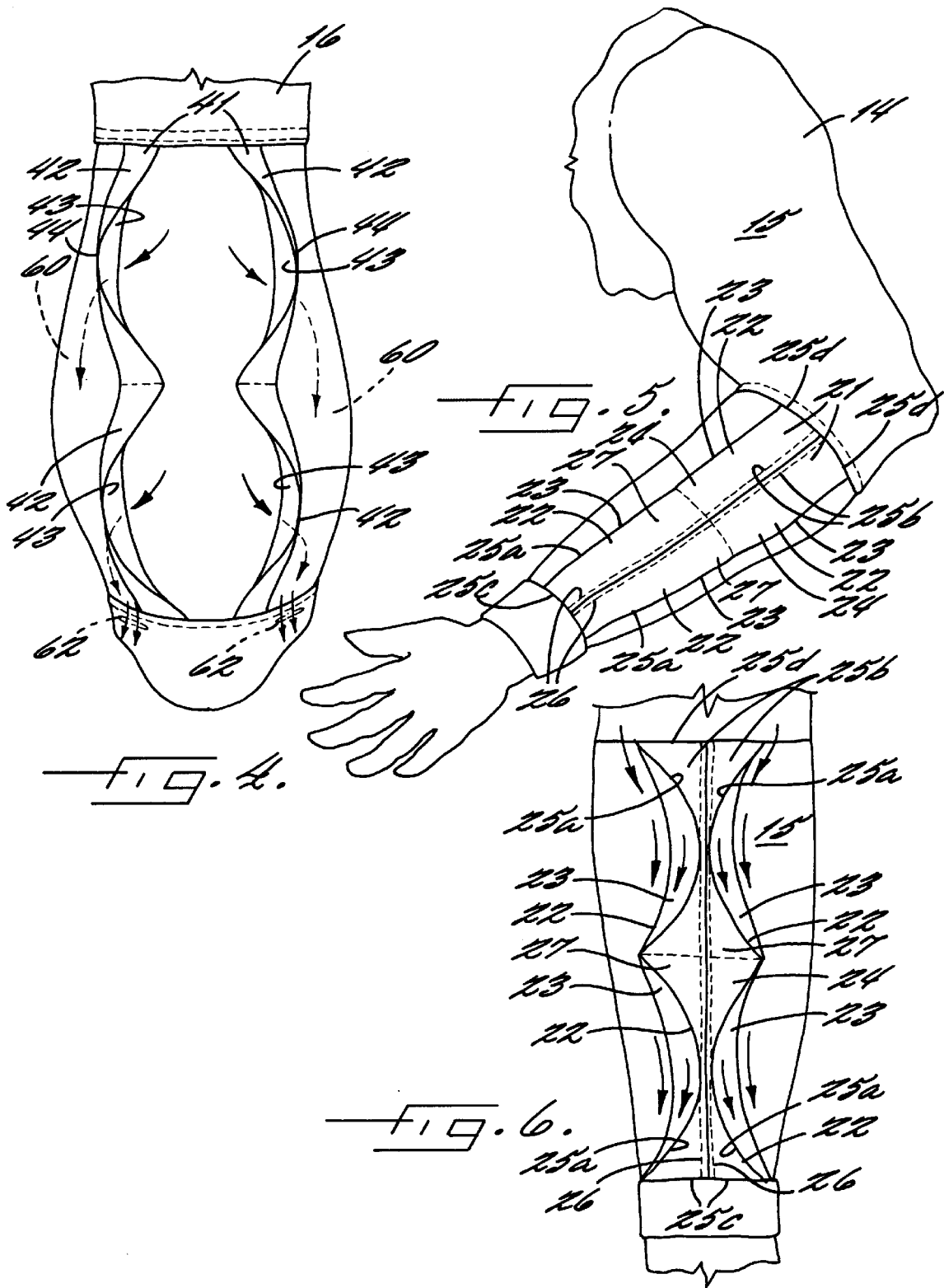

SKYDIVING GARMENT FOR ENHANCING CONTROL AND MANEUVERABILITY DURING FREE-FALL

FIELD OF THE INVENTION

The present invention relates generally to military free-fall and skydiving and more particularly to garments used for military free-fall and skydiving.

BACKGROUND OF THE INVENTION

Parachuting by military personnel and civilians often includes "free-fall" between exiting an aircraft and the deployment of a parachute. During free-fall, the parachutist configures his/her body to maneuver through the air, adjust fall rate, and control lateral movement with respect to the ground. Military free-fall and civilian skydiving are performed in the "frog position," wherein the parachutist faces the earth, the back is arched, the pelvis is down, the arms are out with elbows bent, and the legs are bent at the knees with the feet extending upwards away from the earth. Bringing the feet up closer to the derriere will cause the free-faller to backslide. Extending the feet away from the derriere will cause forward movement. Extending the feet directly upwards away from the earth is called the neutral position and causes neither forward nor backward movement.

The object of military parachuting is to deploy troops within a specific zone, and is typically attained in one of the following two ways: high altitude, high opening (HAHO); and high altitude, low opening (HALO). During HAHO, a detachment exits an aircraft at high altitudes (typically exceeding 25,000 feet), deploys parachutes soon thereafter, and then drifts downward to the prescribed location. Depending on the winds, the detachment might be able to drift up to 18 miles in any lateral direction with respect to the earth. HAHO allows military personnel to deploy from the aircraft further from the target.

Unfortunately, winds at high altitudes can be unpredictable and make it difficult for all members of a detachment to land at the same location. In addition, deployment of parachutes at high altitudes requires a parachutist to be suspended within the parachute harness for long periods of time, often 20 to 30 minutes. This length of time often causes the legs and arms to fall asleep because of decreased circulation. Furthermore, high altitudes often cause parachutists to become very cold and requires oxygen for breathing. In addition, HAHO causes a parachutist to be more susceptible to detection because his/her parachute is open for such a long period of time.

HALO involves exiting from an aircraft at about 25,000 feet and free-falling to about 4,000 feet before deploying the parachute. The lateral distance with respect to the earth that a military parachutist is able to cover during free-fall is limited. Thus, HALO requires a military detachment to exit an aircraft that is relatively close to the target, thereby increasing the risk detection.

The civilian sport of skydiving involves various competitive aspects of free-falling, including: style, relative work, sit flying, sky surfing and free-style. Style is a competitive event in which the skydiver exits an aircraft at approximately 7,500 feet and then assumes a tuck position in which the face is to earth, the knees are drawn up towards the chest, and the arms are held tightly near the body. The arms, feet, and legs are used to help the skydiver perform "style set" which includes a 360° right turn, a 360° left turn, and a back loop. Each turn and back loop is repeated a second time for a complete style set, and the entire style set is performed as quickly as possible in a range of about 6 to 8 seconds.

Sit flying involves skydiving in a sitting position with arms extending out from the body for control purposes. Sky-surfing involves skydiving with a small surfboard strapped to the feet, and performing a preplanned series of maneuvers. Free-style involves performing various choreographic maneuvers. "Relative work" involves two or more skydivers falling relative to each other for the purpose of carrying out a preplanned set of maneuvers. These maneuvers involve turns, forward and backward movement, and side to side movement. Before a maneuver can occur, all of the skydivers must "dock" together. To do this, each skydiver must increase his/her fall rate in order to join the other skydivers. Therefore, it is necessary that each skydiver join the formation as quickly as possible to ensure enough time to perform the maneuvers. Unfortunately, skydivers fall at different rates depending on their height and weight.

Each of the above described civilian and military free-fall activities requires the ability to maneuver quickly and accurately. In addition, many free-fall activities involve multiple skydivers and multiple military parachutists in the air at any given time. It is understood that the terms "skydiver" and "skydiving" will be used hereinafter to refer to both civilian skydivers and civilian skydiving, and military parachutists and military free-fall. Collisions during free-fall can be fatal. It is especially important that each skydiver be aware of his/her position relative to other skydivers and be able to move quickly in whatever direction necessary to avoid a collision. Therefore it would be desirable to provide a way to enhance maneuverability, fall rate control, and lateral speed control.

SUMMARY OF THE INVENTION

It is therefore an object of the present invention to provide a skydiver with increased control over lateral speed during free-fall.

It is another object of the present invention to provide a skydiver with increased control over maneuverability and fall rate during free-fall.

It is another object of the present invention to allow skydivers to exit an aircraft a great distance from their target and without having to spend a lot of time suspended in the harness of a deployed parachute.

These and other objects are accomplished, according to one aspect of the present invention, by a skydiving garment for providing the wearer with enhanced control, maneuverability, and speed during free-fall. The garment includes a torso portion configured to fit the wearer and has sleeves and leg portions sized to receive the arms and legs of the wearer, respectively. The sleeves and leg portions have a generally tubular shape that extends in the longitudinal direction of the limb contained therewithin. The leg portions of the skydiving garment may have a toe portion or some other means for securing each leg portion to a foot of the wearer.

At least one pocket is mounted on the exterior surface of each sleeve and leg portion. Each pocket has an opening which extends in the longitudinal direction and which is configured to selectively balloon open when exposed by the wearer to an airstream during free-fall, thereupon providing the wearer with enhanced control and maneuverability during free-fall. Typically, two rows of laterally spaced apart longitudinally aligned pockets, with the openings of each pocket extending in the longitudinal direction, and with the openings of the pockets of the two rows facing each other, are mounted on the exterior surface of each leg portion. The rows are typically spaced apart between about 2.5" and 4".

Typically, two rows of adjacent longitudinally aligned pockets, with the openings of each pocket extending in the longitudinal direction, and with the openings of the pockets of the two rows facing away from each other, are mounted on the exterior surface of each sleeve.

Each pocket is typically formed from an elongate fabric strip of cotton, poly/cotton blends, nylon, spandex, cordura, parapak, and the like, having opposing first and second edge portions and opposing third and fourth edge portions. The fabric strip is secured to the exterior surface of each leg portion along the first edge portion and along the third and fourth edge portions. The fabric strip is secured to each sleeve portion along the second edge portion and along the third and fourth edge portions. Each elongate fabric strip may also be secured to each sleeve and leg portion along a medial portion of the fabric strip to define a pair of longitudinally aligned pockets. Each elongate strip has a dimension between said opposing first and second edge portions of between about 0.5" and 3.5", and a dimension between the opposing third and fourth edge portions of between about 5" and 25".

According to another aspect of the present invention, the leg portions may include air passages which vent each pocket to an outlet in the interior of the leg portion. This allows the air to balloon open the pocket and enhance maneuverability and control while adding considerable drag which will dramatically increase the lateral speed of the wearer. By increasing drag, the wearer is capable of obtaining very high lateral speeds through the air during free-fall.

The present invention is advantageous because it increases control during turns and other maneuvers as well as fall rate compensation. Thus, the maneuverability of an individual free-faller is enhanced and the ability of multiple skydivers to track, turn and fall together as a group is enhanced.

BRIEF DESCRIPTION OF THE DRAWINGS

FIG. 1 illustrates a skydiver in free-fall wearing a jumpsuit having the pockets mounted on the exterior surface of the sleeves and leg portions, according to the present invention.

FIG. 2 illustrates a jumpsuit having the pockets mounted on the exterior surface of the sleeves and leg portions, according to the present invention.

FIG. 3 illustrates a leg portion of a jumpsuit having pockets according to the present invention.

FIG. 4 illustrates the pockets on a leg portion ballooning open when exposed by the wearer to an airstream during free-fall.

FIG. 5 illustrates a sleeve of a jumpsuit having pockets according to the present invention.

FIG. 6 illustrates the pockets on a sleeve ballooning open when exposed by the wearer to an airstream during free-fall.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to FIG. 1, a skydiver 5 wearing a skydiving garment (jumpsuit) 10, according to the present invention, is illustrated. The illustrated garment 10 is a conventional jumpsuit modified to include longitudinally aligned pockets mounted on the sleeves and leg portions, as will be described in greater detail below. A parachute is carried in the pack 11 strapped to the back of the skydiver 5 and is deployed after free-fall to safely land the skydiver on the ground. The skydiver 5 is in a typical free-fall position and is shown using his arms and legs for control and maneuverability.

Referring now to FIG. 2, the skydiving garment 10 includes a torso portion 12 with sleeve portions 14 and leg portions 16 depending therefrom. Each sleeve portion 14 is configured to fit an arm of the wearer, and each leg portion 16 is configured to fit the leg of the wearer. Each sleeve portion 14 has a generally circular cross-section and is tubular along the longitudinal direction of the arm contained therein, thereby conforming to the shape of the arm and providing a reasonably loose, yet comfortable, fit. Similarly, each leg portion 16 has a generally circular cross-section and is tubular along the longitudinal direction of the leg contained therein, thereby conforming to the shape of the leg and providing a reasonably loose, yet comfortable, fit.

Each sleeve portion 14 includes a forearm portion 20 having at least one pocket 22 mounted to an exterior surface 15, thereof. Each pocket 22 has an opening 23 which extends along the longitudinal direction defined by the forearm, and which is configured to selectively balloon open when exposed by the wearer to an airstream during free-fall, thereupon providing the wearer with enhanced control and maneuverability. Each leg portion 16 includes a lower leg portion 40 having at least one pocket 42 mounted to an exterior surface 17, thereof. Each pocket 42 has an opening 43 which extends along the longitudinal direction defined by the forearm, and which is configured to selectively balloon open when exposed by the wearer to an airstream during free-fall, thereupon providing the wearer with enhanced control and maneuverability.

Referring now to FIG. 5, the forearm portion 20 of each sleeve 14 will be described in greater detail. Because the forearm portions 20 of each respective sleeve 14 are symmetrically identical, only the left sleeve will be described. In the illustrated embodiment, two adjacent rows 21 of two pockets 22 each are secured to the exterior surface 15 of the forearm portion 20. The pockets 22 have openings 23 extending in the longitudinal direction defined by the forearm, and the openings of each row face a direction opposite from that of the opposing row, as shown.

Preferably, each row of pockets 22 is formed from an elongate fabric strip 24 having opposing first and second edge portions 25a,25b and opposing third and fourth edge portions 25c,25d. Each fabric strip 24 is secured to the exterior surface 15 of the forearm portion 20 along the second edge portion 25b, and along the third and fourth edge portions 25c,25d. Preferably, the second, third and fourth edge portions 25b,25c,25d are secured to the exterior surface 15 via stitching 26. However, other methods of securing each fabric strip 24 to the exterior surface 15 of the forearm portion 20 may be used, as would be known to those having skill in the art. In addition, the pockets 22 of the present invention may be located on any portion of each sleeve portion 14, and are not limited to the illustrated location.

In the illustrated embodiment, each elongate fabric strip 24 is also secured along a medial portion 27 to the exterior surface 15 of the forearm portion 20 to define two longitudinally aligned pockets 22 having openings 23 extending in the longitudinal direction. Multiple longitudinally aligned pockets 22 may be obtained by securing each elongate fabric strip 24 to the exterior surface 15 of the forearm portion 20 at several medial locations. In addition, multiple longitudinally aligned elongate fabric strips may be used to form multiple longitudinally aligned pockets without departing from the spirit and intent of the present invention.

Referring now to FIGS. 2 and 3, the leg portions 16 of the skydiving garment 10, according to the present invention, will now be described in detail. Each leg portion 16 includes a lower leg portion 40 having two laterally spaced apart rows 41 of pockets 42 mounted to an exterior surface 17, thereof. The openings 43 of the pockets of each row 41 extend in the longitudinal direction of the leg and each pocket 42 is configured to selectively balloon open when exposed by the wearer to an airstream during free-fall, thereupon providing the wearer with enhanced control and maneuverability during free-fall.

Referring now to FIG. 3, the lower leg portion 40 of each leg portion 16 will be described in greater detail. Because the lower leg portions 40 of each respective leg portion are symmetrically identical, only one lower leg portion will be described. In the illustrated embodiment, two laterally spaced apart rows 41 of two pockets 42 each are secured to the exterior surface 17 of the lower leg portion 40. The pockets 42 have openings 43 extending in the longitudinal direction defined by the leg, and the openings of each row face the openings of the opposing row, as shown.

Preferably, each pocket 42 is formed from an elongate fabric strip 44 having opposing first and second edge portions 45a,45b and opposing third and fourth edge portions 45c,45d. Each fabric strip 44 is secured to the exterior surface 17 of the lower leg portion 40, along the first edge portion 45a, and along the third and fourth edge portions 45c,45d. Preferably, the first, third and fourth edge portions 45a,45c,45d are secured to the exterior surface 17 via stitching 26. However, other methods of securing each respective fabric strip 44 to the exterior surface 17 of the lower leg portions 40 may be used, as would be known to those having skill in the art. In addition, the pockets 42 of the present invention may be located on any portion of each leg portion 16, and are not limited to the illustrated location.

In the illustrated embodiment, each elongate fabric strip 44 is also secured along a medial portion 47 to the exterior surface 17 of the lower leg portion 40 to define two longitudinally aligned pockets 42 with the openings 43 of each pocket extending in the longitudinal direction. Multiple longitudinally aligned pockets 42 may be obtained by securing the elongate fabric strip 44 to the exterior surface 17 of the lower leg portion 40 at several medial portions. In addition, multiple longitudinally aligned elongate fabric strips may be used to produce multiple pockets without departing from the spirit and intent of the present invention.

Referring now to FIG. 3, the lower leg portion 40 also includes a toe portion 50 and a heel portion 52. The toe portion 50 is configured to slip over the toe portion of the shoe of a wearer and serves as means for keeping the lower leg portion 40 substantially taut so that each pocket can be exposed adequately to an airstream during free-fall. Without the toe portion 50 or some other means for securing the lower leg portion 40 to the foot of the wearer, the lower leg portion would have the tendency to rise up the leg of the wearer due to the force of the air during free-fall. However, as would be known by those having skill in the art, other ways of maintaining the lower leg portion 40 in a taut position during free-fall may be utilized without departing from the spirit and intent of the present invention. Preferably, the bottom 51 of the toe portion 50 is made from material capable of resisting damage caused by the wearer walking with the toe portion secured to the shoe.

The heel portion 52 is designed to fit snugly around the heel of the wearer via an elastic band 53, as illustrated. However, other means for causing the heel portion 52 to fit snugly around the heel of the wearer may be utilized, and is not limited to the illustrated embodiment. It is not necessary for the heel portion 52 to slip under the heel of the wearer, because the toe portion 50 helps to keep the lower leg portion substantially taut during free-fall. In the illustrated embodiment, a zipper 54 is provided to facilitate the removal of the lower leg portion 40 from the foot of the wearer. In addition, the zipper 54 facilitates maintaining the lower leg portion 40 snugly around the leg of the wearer. A locking mechanism 56 is provided to help prevent the zipper 54 from becoming unsecured during free-fall. Preferably the locking mechanism 56 is a velcro strip that can be engaged and disengaged easily. However, other means for ensuring that the zipper 54 does not become unsecured during free-fall can be utilized, as would be known to those having skill in the art.

Preferably, each pocket 22,42 on a sleeve portion 14 and leg portion 16 respectively, is formed from material such as cotton, poly/cotton blends, nylon, spandex, cordura, parapak, and the like. The material may be the same material from which the jumpsuit 10 is made. Preferably, the stitching 26 for securing the pockets in the illustrated embodiment is thread made from nylon, polyester, and the like. The length of each pocket opening and the amount each pocket opens typically varies depending on the inseam length, height and weight of the wearer.

In general, each pocket 42 on a leg portion 16 is sized based on a calculated "fall rate." Fall rate is determined for each skydiver and is the skydiver's weight in pounds divided by his/her height in inches. For example, the fall rate for a skydiver having a weight of 200 pounds and a height of 72 inches is 2.7. The average fall rate for most skydivers is around 2.5, with lighter skydivers having fall rates less than 2.5 and heavier skydivers having fall rates greater than 2.5.

The width (i.e., the distance between opposing first and second edge portions 45a, 45b) of each fabric strip 44 used to form a pocket 42 is determined from the calculated fall rate for each skydiver according to Table 1:

TABLE 1

| Fall Rate | Fabric Strip Width |
| --- | --- |
| 1.9–2.1 | 1.5" |
| 2.2–2.5 | 1.75" |
| 2.6–2.9 | 2.0" |
| 3.0–3.3 | 2.25" |
| 3.4–3.7 | 2.5" |
| 3.8–4.1 | 2.75" |

The lengthwise edge portion secured to the exterior surface of the portions (first edge portion 45a), has about 0.5" folded under and is stitched down. Preferably two rows of stitching 26 separated by about 0.25" are used.

The length (i.e., the distance between opposing third and fourth edge portions 45c, 45d) of each fabric strip 44 used to form a pocket 42 on the leg portion 40 is determined from two inseam measurements of a skydiver, as described below. The first measurement is the distance from the crotch to the floor with the skydiver wearing jump shoes, and the second measurement is the distance from the crotch to the top of the knee cap. These measurements are used as follows to determine the length of each fabric strip:

(crotch to floor)−(crotch to knee)−4"=length.

Thus, for a skydiver having a crotch to floor measurement of 36" and a crotch to knee measurement of 14", the length of each fabric strip is 36"−14"−4"=18".

Lateral speed can be increased and decreased by increasing or decreasing the length and width of each fabric strip 44, either individually or in combination, accordingly. The length and width of a fabric strip 24 used to form a pocket 22 on a sleeve 14 is determined based on the width and length of a skydiver's forearms and on the type of control desired.

In addition to the illustrated embodiment, the pockets of the present invention may be integrally incorporated into a jumpsuit without the need for a separate fabric strip. Also, the present invention may be incorporated into generally tubular portions that are sized to receive a limb of the wearer therein. For example, sleeves having pockets according to the present invention thereon may be slipped onto the arms of a skydiver and secured thereto. Similarly, leg portions having pockets according to the present invention thereon may be slipped onto the legs of a skydiver and secured thereto. The pockets of the present invention may also have means for securing them directly to the sleeve and leg portions of conventional jumpsuits.

Referring now to FIG. 4, the operation of a pocket on a leg portion 40, in accordance with the present invention, will now be described in detail. When a pocket 42 is exposed to an air stream during free-fall, it is opened by the force of the air pushing the fabric strip 44 away from the exterior surface 17 of the lower leg portion 40. When a pocket opens, the surface area of the leg area is increased, thereby increasing the amount of drag on the skydiver. As drag increases, forward motion and lift increases. The illustrated embodiment of the present invention can dramatically increase a skydiver's lateral speed with respect to the earth. Because of this increased speed capability, a skydiver can travel large distances with respect to the earth and can, therefore, exit an aircraft from a location that is much further from the landing target than is presently possible with existing jumpsuits. When a skydiver points his/her toes downward and away from the knees, this causes the fabric to tighten in the front portion of each leg portion 40 which facilitates inflating the pockets 42 with air.

Referring now to FIG. 6, the operation of a pocket 22 on a sleeve 14, in accordance with the present invention, is illustrated. When a pocket 22 is exposed to an air stream during free-fall, it is opened by the force of the air pushing the fabric strip 24 away from the exterior surface 15 of the forearm portion 20. The orientation of the pockets 22, as illustrated, facilitates stopping a turn or stopping forward motion during free-fall.

Because of the independent construction of each pocket on the leg and sleeve portions, each pocket can react independently of the other pockets to facilitate maneuverability. By selectively exposing pockets to the air stream, a skydiver wearing the present invention can enhance his/her control and maneuverability during free-fall as well as his/her speed. For example, dropping one knee in free-fall normally causes a leg turn. With the present invention, the leg turn can be completed very rapidly and crisply. Other maneuvers, including back flips and the like can also be completed more rapidly and with greater control than heretofore possible. In addition, the present invention allows a skydiver to control his/her fall rate and thereby facilitate docking with other skydivers in a short period of time.

According to another aspect of the present invention, illustrated in FIG. 4, each lower leg portion 40 may include air passages 60 for venting each pocket 42 to an outlet 62 in the interior portion of the lower leg portion. Each air passage 60 may include baffles therein. Each passage 60 may also vent to an outlet in the exterior surface 17 of the lower leg portion 40. When a pocket 42 is exposed to an airstream during free-fall, the air that causes the pocket to balloon open is allowed to flow through air passage 60 and exit through outlet 62, as illustrated. By allowing air to flow through a pocket, the lateral speed of a skydiver can be increased more than with the embodiment of the present invention not incorporating the passage 60 and outlet 62. Testing has revealed lateral speeds with respect to the earth in excess of 250 miles per hour and covering ground distances of more than 12 miles. Consequently, with this embodiment, a skydiver can exit an aircraft even further from the landing target.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A skydiving garment for providing the wearer with enhanced control and maneuverability during free-fall, comprising:

a torso portion configured to fit the wearer and having a tubular portion which is sized to receive a limb of the wearer therein, said tubular portion having an exterior surface and defining a longitudinal direction which extends in the direction of the limb; and at least two adjacent pockets mounted on said tubular portion exterior surface, said pockets having respective openings which extend in said longitudinal direction, and which are configured to selectively balloon open when exposed by the wearer to an airstream during free-fall, thereupon providing the wearer with enhanced control and maneuverability during free-fall.

2. A skydiving garment according to claim 1 wherein said at least two adjacent pockets comprise at least two laterally spaced apart pockets, with the openings of the two pockets extending in the longitudinal direction and facing each other.

3. A skydiving garment according to claim 1 wherein said at least two adjacent pockets comprise two laterally spaced apart rows of pockets, with the openings of the pockets of each row extending in the longitudinal direction, and with the openings of the pockets of the two rows facing each other.

4. A skydiving garment according to claim 1 wherein said at least two adjacent pockets comprise two adjacent rows of pockets, with the openings of the pockets of each row extending in the longitudinal direction, and with the openings of the pockets of the two rows facing away from each other.

5. A skydiving garment according to claim 1 further comprising air passage means for venting at least one of said at least two adjacent pockets to an outlet in the exterior surface of said tubular portion.

6. A skydiving garment according to claim 1 wherein each of said at least two adjacent pockets comprises an elongate fabric strip having opposing first and second edge portions and opposing third and fourth edge portions, said fabric strip secured to the exterior surface of said tubular portion along said first edge portion and along said third and fourth edge portions.

7. A skydiving garment according to claim 6 wherein said elongate fabric strip is also secured to said tubular portion along a medial portion of said fabric strip to define a pair of longitudinally aligned pockets, each of which is configured to selectively balloon open when exposed by the wearer to an airstream during free-fall.

8. A skydiving garment according to claim 6 comprising a pair of said laterally spaced apart elongate fabric strips secured to said tubular portion, each one of said pair of elongate fabric strips defining a plurality of pockets configured to selectively balloon open when exposed by the wearer to an airstream during free-fall.

9. A skydiving garment according to claim 1 further comprising means for securing said tubular portion to a foot of the wearer.

10. A skydiving garment according to claim 6 wherein said elongate strip has a dimension between said opposing first and second edge portions of between about 0.5" and 3.5".

11. A skydiving garment according to claim 6 wherein said elongate strip has a dimension between said opposing third and fourth edge portions of between about 5" and 25".

12. A skydiving garment according to claim 8 wherein said pair of elongate strips are spaced apart between about 1" and 6". thereupon providing the wearer with enhanced control and maneuverability during free-fall.

13. A skydiving garment according to claim 1 wherein said at least two adjacent pockets are formed of material selected from the group consisting of cotton, poly/cotton blends, nylon, spandex, cordura, and parapak.

14. A skydiving garment for providing the wearer with enhanced control and maneuverability during free-fall, comprising:
  a torso portion configured to fit the wearer and having a a pair of sleeves configured to cover the arms of a wearer, and a pair of leg portions configured to cover the legs of a wearer, each of said pair of sleeves and pair of leg portions having respective exterior surfaces and each defining a respective longitudinal direction which extends in the direction of a respective limb therein; and
  two laterally spaced apart rows of pockets mounted on the exterior surface of each one of said sleeves and leg portions, each pocket having an opening extending in the longitudinal direction of the respective sleeve or leg portion on which it is mounted, and with the openings of the pockets of the two rows opposing each other, each pocket configured to selectively balloon open when exposed by the wearer to an airstream during free-fall, thereupon providing the wearer with enhanced control and maneuverability during free-fall.

15. A skydiving garment according to claim 14 wherein said two laterally spaced apart rows of pockets comprise a plurality of longitudinally aligned pockets, with the openings of each of said pockets extending in the longitudinal direction of the respective tubular portion on which it is mounted.

16. A skydiving garment according to claim 14 further comprising air passage means for venting at least one of said two laterally spaced apart rows of pockets to an outlet in a respective exterior surface of a respective sleeve or leg portion on which said rows of pockets are mounted.

17. A skydiving garment according to claim 14 further comprising means for securing each of said leg portions to a respective foot of the wearer.

18. A skydiving garment for providing the wearer with enhanced control and maneuverability during free-fall, comprising:
  a torso portion configured to fit the wearer and having a plurality of tubular portions each of which is sized to receive a respective limb of the wearer therein, each of said tubular portions having an exterior surface and each defining a respective longitudinal direction which extends in the direction of a respective limb therein, wherein said plurality of tubular portions comprises a pair of sleeves configured to cover the arms of a wearer, and a pair of leg portions configured to cover the legs of a wearer;
  a pair of laterally spaced apart elongate fabric strips secured to each one of said sleeves and leg portions, each one of said pair of elongate fabric strips defining a plurality of longitudinally aligned pockets configured to selectively balloon open when exposed by the wearer to an airstream during free-fall, thereupon providing the wearer with enhanced control and maneuverability during free-fall; and
  wherein each elongate fabric strip on said leg portions has opposing first and second edge portions, and opposing third and fourth edge portions defining a medial portion therebetween, and is secured to the exterior surface of a respective tubular portion along said first edge portion, along said third and fourth edge portions, and along said medial portion.

19. A skydiving garment according to claim 18 wherein said garment comprises means for securing each leg portion to a foot of the wearer.

20. A skydiving garment according to claim 18 wherein each elongate fabric strip on said sleeves has opposing first and second edge portions, and opposing third and fourth edge portions defining a medial portion therebetween, and is secured to the exterior surface of a respective tubular portion along said second edge portion, along said third and fourth edge portions, and along said medial portion.

21. A skydiving garment according to claim 18 further comprising air passage means for venting at least one of said pockets to an outlet in the exterior surface of the respective tubular portion on which said pocket is mounted.

22. A skydiving garment for providing the wearer with enhanced control and maneuverability during free-fall, comprising:
  a tubular portion which is sized to receive a limb of the wearer therein, said tubular portion having an exterior surface and defining a longitudinal direction which extends in the direction of the limb;
  at least one pocket mounted on said tubular portion exterior surface, said at least one pocket having an opening which is configured to selectively balloon open when exposed by the wearer to an airstream during free-fall, thereupon providing the wearer with enhanced control and maneuverability during free-fall; and
  air passage means for venting said at least one pocket to an outlet in the exterior surface of said at least one tubular portion.

23. A skydiving garment according to claim 22 wherein said opening of said at least one pocket extends in said longitudinal direction.

24. A skydiving garment according to claim 23 wherein said at least one pocket comprises a plurality of longitudinally aligned pockets, with the openings of each of said pockets extending in said longitudinal direction.

25. A skydiving garment according to claim 23 wherein said at least one pocket comprises at least two laterally spaced apart pockets, with the openings of the two pockets extending in the longitudinal direction and facing each other.

26. A skydiving garment according to claim 23 wherein said at least one pocket comprises two laterally spaced apart rows of pockets, with the openings of the pockets of each row extending in the longitudinal direction, and with the openings of the pockets of the two rows facing each other.

27. A skydiving garment according to claim 23 wherein said at least one pocket comprises two adjacent rows of pockets, with the openings of the pockets of each row extending in the longitudinal direction, and with the openings of the pockets of the two rows facing away from each other.

28. A skydiving garment according to claim 22 wherein said at least one pocket is formed of material selected from the group consisting of cotton, poly/cotton blends, nylon, spandex, cordura, and parapak.

29. A skydiving garment for providing the wearer with enhanced control and maneuverability during free-fall, comprising:

a torso portion configured to fit the wearer and having a tubular portion which is sized to receive a limb of the wearer therein, said tubular portion having an exterior surface and defining a longitudinal direction which extends in the direction of the limb;

at least one pocket mounted on said tubular portion exterior surface, said pocket having an opening which is configured to selectively balloon open when exposed by the wearer to an airstream during free-fall, thereupon providing the wearer with enhanced control and maneuverability during free-fall; and air passage means for venting said at least one pocket to an outlet in the exterior surface of said tubular portion.

30. A skydiving garment according to claim 29 wherein said opening of said pocket extends in said longitudinal direction.

31. A skydiving garment according to claim 30 wherein said at least one pocket comprises a plurality of longitudinally aligned pockets, with the openings of each of said pockets extending in said longitudinal direction.

32. A skydiving garment according to claim 30 wherein said at least one pocket comprises at least two laterally spaced apart pockets, with the openings of the two pockets extending in the longitudinal direction and facing each other.

33. A skydiving garment according to claim 30 wherein said at least one pocket comprises two laterally spaced apart rows of pockets, with the openings of the pockets of each row extending in the longitudinal direction, and with the openings of the pockets of the two rows facing each other.

34. A skydiving garment according to claim 30 wherein said at least one pocket comprises at least two adjacent pockets, with the openings of the two pockets extending in the longitudinal direction and facing away from each other.

35. A skydiving garment according to claim 30 wherein said at least one pocket comprises two adjacent rows of pockets, with the openings of the pockets of each row extending in the longitudinal direction, and with the openings of the pockets of the two rows facing away from each other.

36. A skydiving garment for providing the wearer with enhanced control and maneuverability during free-fall, comprising:

a torso portion configured to fit the wearer and having a tubular portion which is sized to receive a limb of the wearer therein, said tubular portion having an exterior surface and defining a longitudinal direction which extends in the direction of the limb;

a plurality of pockets mounted on said tubular portion exterior surface, each of said pockets having an opening which is configured to selectively balloon open when exposed by the wearer to an airstream during free-fall, thereupon providing the wearer with enhanced control and maneuverability during free-fall, said plurality of pockets comprising a pair of laterally spaced apart elongate fabric strips secured to said tubular portion, said pair of elongate fabric strips comprising respective opposing first and second edge portions and opposing third and fourth edge portions, said fabric strips secured to the exterior surface of said tubular portion along said first edge portion and along said third and fourth edge portions, wherein said pair of elongate strips are spaced apart between about 1" and 6"; and air passage means for venting said at least one pocket to an outlet in the exterior surface of said tubular portion.

37. A skydiving garment according to claim 36 wherein said plurality of pockets are formed of material selected from the group consisting of cotton, poly/cotton blends, nylon, spandex, cordura, and parapak.

\* \* \* \* \*

UNITED STATES PATENT AND TRADEMARK OFFICE
CERTIFICATE OF CORRECTION

PATENT NO. : 5,890,225
DATED : April 6, 1999
INVENTOR(S) : Wendy A. Marschall

It is certified that error appears in the above-indentified patent and that said Letters Patent is hereby corrected as shown below:

In claim 12 delete "thereupon providing the wearer with enhanced control and maneuverability during free-fall."

Signed and Sealed this

Twenty-sixth Day of October, 1999

Attest:

Q. TODD DICKINSON

*Attesting Officer*      *Acting Commissioner of Patents and Trademarks*